United States Patent Office 2,711,935
Patented June 28, 1955

2,711,935

MEANS FOR ADJUSTING THE POSITION OF A SHAFT AND FOR INDICATING THE EXTENT OF SAID ADJUSTMENT

William Henry Miles, Bristol, England, assignor to Strachan & Henshaw, Limited, Bristol, England, a corporation of Great Britain and Northern Ireland Application March 18, 1952, Serial No. 277,324

Claims priority, application Great Britain March 20, 1951

3 Claims. (Cl. 308—62)

This invention relates to means for adjusting the position of a shaft and for indicating the extent of said adjustment, the object being to provide improvements therein.

Means according to this invention comprises a circular housing adapted for the shaft to be rotatably mounted therein, the shaft being disposed eccentrically of the housing, the said housing being adapted to be rotatably mounted in a fixed support, means for angularly moving the housing in said fixed support, and means for securing the housing against relative angular movement in the fixed support, and is characterised by an indicator device rigidly mounted in relation to the said fixed support, and an arcuate surface rigidly mounted in relation to said housing and being concentric with the shaft, the said indicator device and the said arcuate surface being adapted for relative co-operation. The said indicator device may be a dial indicator device, and may be provided with a movable arm or like device adapted when moved to actuate a pointer or other device in relation to the dial, the said arcuate surface and the said movable arm or like device being adapted to co-operate in such manner that rotary movement of the arcuate surface effects movement of said arm or the like.

One form of means according to this invention is illustrated in the accompanying drawings, wherein.

Figure 1:
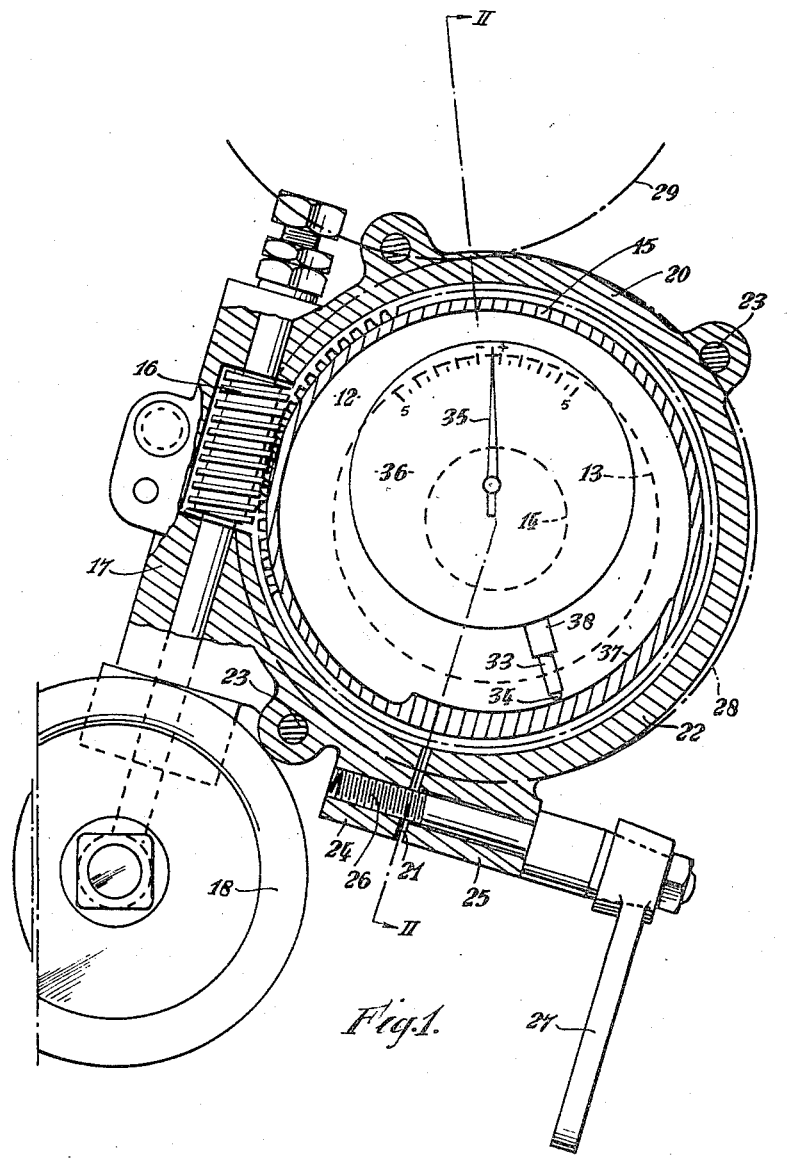
Fig. 1 is a transverse sectional elevation, on line I—I of Fig. 2.

In a fixed part 11 of a machine frame there is disposed a circular bearing housing 12 which is rotatable in said part 11 of the frame. The bearing housing has a roller bearing 13, or other bearing, eccentrically disposed therein. A shaft 14 is disposed in the bearing 13 so as to be rotatable in the bearing housing 12. A worm wheel 15 is rigidly secured by screw studs 19 to the bearing housing 12, co-axially therewith. A worm 16 is mounted in a worm housing 17 which is fixed to the frame part 11 and the worm is associated with the worm wheel 15 and provided with a hand-wheel 18 in geared connection therewith whereby rotation of the bearing housing 12 in the frame may be effected manually.

The worm wheel 15 is mounted within an encircling ring 20, hereinafter referred to as the worm wheel housing, which, for convenience, is integral with the worm housing 17. The worm wheel housing 20 is split or cut radially at 21 to form, in effect, a split ring, and, except for an arcuate portion 22 extending to one side from the said split, is rigidly secured to the frame part 11 by screw studs 23. Clamping elements, provided by bosses 24, 25, are secured to each end of the worm wheel housing 20, at said split 21, and are engaged by a manually rotatable screw 26, provided with a handle 27, whereby the ends of the housing 20 may be drawn together to clamp the housing tightly on to the circumference of the worm wheel 15; thereby, the worm wheel is held against rotation relative to the frame part 11.

A roll 28 is mounted on the shaft 14 and is in rolling engagement with another roll 29; the said two rolls may be rolls of a printing press, the roll 28 being an inking roll whilst the roll 29 may be a printing roll. In order to adjust the pressure between the two rolls 28, 29, the position of the shaft 14, laterally of its axis and in relation to the shaft (not shown) of the roll 29, is adjusted.

In order to effect adjustment of the shaft 14, the worm wheel housing 20 is slackened off the worm wheel 15, by releasing the clamping screw 26, and the worm 16 is operated by the handwheel 18 and thereby the worm wheel 15 together with the bearing housing 12 are moved angularly in the frame part 11. Such angular movement of the bearing housing 12 is continued until the required movement of the shaft 14 is effected.

A dial indicator device 30 is rigidly mounted on the worm wheel housing 20 by means of a bracket 31 and screws 32. The indicator 30 is provided with an axially movable rod 33 which projects approximately radially from the indicator so that when said rod is pressed axially towards the indicator, by pressure applied to the outer free end 34 of the rod, a pointer 35 is moved around a dial 36; the rod 33 is spring urged outwardly of the indicator and slides in a fixed sleeve 38. The outer end 34 of the rod is provided by a freely rotatable ball. An arcuate surface 37 is provided rigid with the bearing housing 12; for example, the arcuate surface 37 may be provided integral with the worm wheel 15. The said arcuate surface 37 is concentric with the bearing 13 and the shaft 14, and eccentric to the bearing housing 12 and the worm wheel 15, and its operative face is directed towards the axes of the bearing housing and shaft. The ball end 34 of the indicator rod 33 co-operates with the said arcuate surface 37, and slides or rolls thereon when the worm wheel 15 and bearing housing 12 are rotated.

As the worm wheel 15 and bearing housing 12 rotate, to effect adjustment of the shaft 14, the arcuate surface 37 moves with them, but, because of the eccentric relation of the said arcuate surface to the bearing housing 12, the point of contact between the arcuate surface and the ball end 34 of the rod 33 approaches or recedes from the indicator 30, according to the direction of angular movement of the bearing housing. Thereby, the indicator rod 33 is moved axially to effect movement of the pointer 35 in relation to the dial 36, and the extent of movement of the shaft 14 is indicated or measured.

The pointer 35 of the indicator is adapted to register with a zero marking on the dial 36 when the rod 33 is midway between the ends of the arcuate surface 37, so that movement of the rod in either direction around said surface will effect movement of the pointer to either side of said zero marking. The dial may be calibrated to indicate suitable movements of the shaft, for example, ten-thousandths of an inch.

Figure 2:
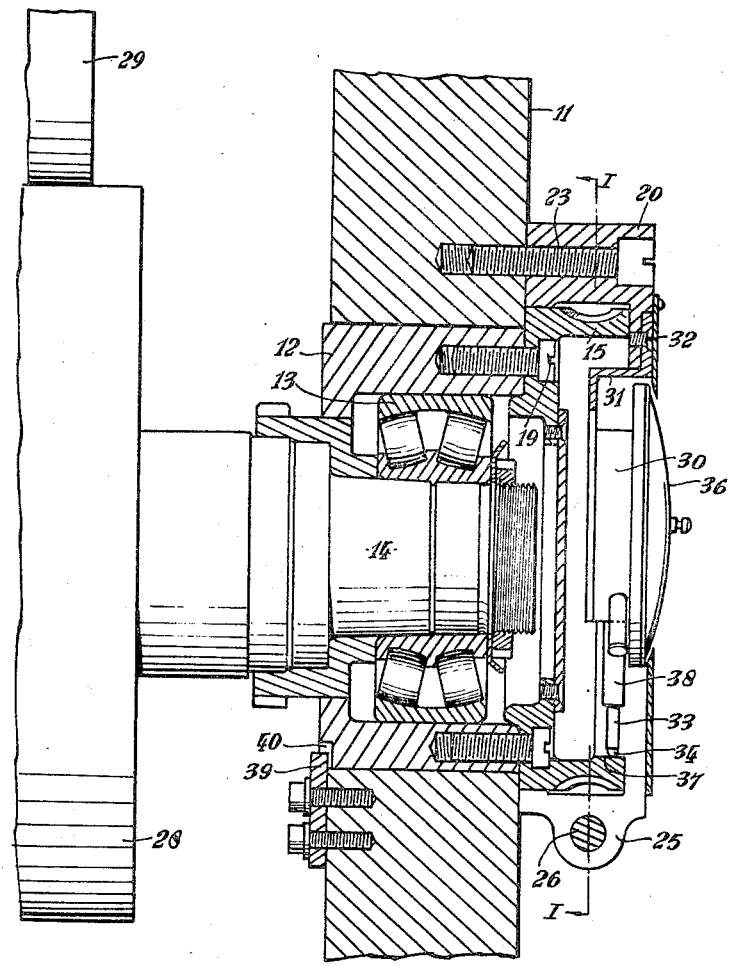
Fig. 2 is a longitudinal sectional elevation, on line II—II of Fig. 1.

Stop means are provided to limit rotation of the bearing housing within an angle which will ensure the indicator rod 33 always being in engagement with the arcuate surface 37; such stop means may comprise a stop 39 secured to the fixed machine part 11 (Fig. 2) and engaging in an arcuate slot 40 in the housing 12, the ends of the said slot abutting the stop 39 to limit arcuate movement of the housing.

Although, in the form described and illustrated, the worm housing, worm wheel housing, and the dial indicator device are rigidly connected directly or indirectly to the machine frame part 11, it is obvious that some or all of said members may be rigidly secured independently to other fixed machine parts so that there is no relative movement between said members, and between them and the fixed parts of the machine.

The invention is useful for adjusting the pressure between two contra-rotating rolls, for example, inking or other rolls of a printing press. An adjusting device should be provided on both ends of the roll which is to be adjusted, so as to ensure that the said roll is retained parallel to the co-acting roll.

What I claim and desire to secure by Letters Patent is:

1. Means for adjusting the position of a shaft and for indicating the extent of such adjustment, comprising a shaft, an annular housing mounted on said shaft and within which housing the shaft is rotatable, a fixed support having a bearing within which said housing is eccentrically mounted for rotational adjustment, mechanical means for angularly moving the annular housing in the bearing in said fixed support, means for securing said housing against relative angular movement in said fixed support, an arcuate surface rigidly mounted in relation to said housing in concentric relation to the shaft, and an indicator device rigidly mounted in relation to the fixed support and having means engaging the said arcuate surface on the housing and being displaceable to actuate the indicator device as the housing is angularly moved.

2. The combination according to claim 1, wherein the said indicator device is a dial gauge having a movable element engageable with the arcuate surface and adapted to actuate a pointer in relation to the dial.

3. The combination according to claim 1, wherein the means for angularly moving and securing the annular housing within said fixed support comprises a worm wheel rigidly mounted coaxially in relation to the annular housing, a worm housing rigidly mounted in relation to said fixed support, a worm rotatably mounted in the worm housing, the worm and worm wheel being in meshing engagement with each other, a substantially radial split worm wheel housing encircling a concentric portion of said worm wheel and rigidly mounted in relation to said fixed support, tightening means for clamping the radial split portions of the worm wheel housing around the worm wheel to selectively prevent and allow relative rotation between the worm wheel and the worm wheel housing, and means for rotating said worm.

References Cited in the file of this patent

UNITED STATES PATENTS

| | | |
|---|---|---|
| 100,891 | Haskett | Mar. 15, 1870 |
| 963,559 | Hines | July 5, 1910 |
| 1,972,840 | Graf | Sept. 4, 1934 |
| 2,423,312 | Hamberger | July 1, 1947 |

FOREIGN PATENTS

| | | |
|---|---|---|
| 270,609 | Switzerland | Sept. 15, 1950 |